United States Patent
Whitman et al.

(10) Patent No.: US 10,459,904 B2
(45) Date of Patent: Oct. 29, 2019

(54) REAL TIME MAPPING OF USER MODELS TO AN INVERTED DATA INDEX FOR RETRIEVAL, FILTERING AND RECOMMENDATION

(71) Applicant: Spotify AB, Stockholm (SE)

(72) Inventors: Brian Whitman, Cambridge, MA (US); Tyler Williams, Cambridge, MA (US); Hui Ted Cao, Belmont, MA (US)

(73) Assignee: SPOTIFY AB, Stockholm (SE)

( * ) Notice: Subject to any disclaimer, the term of this patent is extended or adjusted under 35 U.S.C. 154(b) by 421 days.

(21) Appl. No.: 13/851,311

(22) Filed: Mar. 27, 2013

(65) Prior Publication Data

US 2013/0262471 A1 Oct. 3, 2013

Related U.S. Application Data

(60) Provisional application No. 61/617,558, filed on Mar. 29, 2012.

(51) Int. Cl.
| | |
|---|---|
| *G06F 16/22* | (2019.01) |
| *G06F 16/432* | (2019.01) |
| *G06F 16/732* | (2019.01) |
| *G06F 16/9032* | (2019.01) |
| *G06F 16/632* | (2019.01) |

(52) U.S. Cl.
CPC ........ *G06F 16/2272* (2019.01); *G06F 16/432* (2019.01); *G06F 16/433* (2019.01); *G06F 16/632* (2019.01); *G06F 16/732* (2019.01); *G06F 16/9032* (2019.01)

(58) Field of Classification Search
CPC ......... G06F 17/30035; G06F 17/30436; G06F 17/30029; G06F 16/2272; G06F 16/432–16/434
See application file for complete search history.

(56) References Cited

U.S. PATENT DOCUMENTS

| | | | |
|---|---|---|---|
| 4,606,002 A | * | 8/1986 | Waisman et al. |
| 5,799,184 A | * | 8/1998 | Fulton et al. |
| 6,070,164 A | * | 5/2000 | Vagnozzi .......... G06F 17/30324 |
| 7,693,887 B2 | * | 4/2010 | McLaughlin ..... G06F 17/30053 707/616 |

(Continued)

FOREIGN PATENT DOCUMENTS

| | | |
|---|---|---|
| CA | 2 253 744 A1 | 5/2000 |
| EP | 1 675 020 A2 | 6/2006 |
| WO | WO 2010/087909 A1 | 8/2010 |

OTHER PUBLICATIONS

Int'l Search Report and Written Opinion of the Int'l Searching Authority for Int'l Pat. Appl'n. No. PCT/US2013/034127, dated May 8, 2013, (10 pages).

(Continued)

*Primary Examiner* — Brittany N Allen
(74) *Attorney, Agent, or Firm* — Merchant & Gould P.C.

(57) ABSTRACT

A catalog record is bridged to information stored in at least one inverted index by receiving an application user interface call associated with a predetermined filter request including a record identifier identifying a record in a relational database. A bitset is generated based on item identifiers in the record. The bitset is applied to at least one inverted index to obtain metadata associated with the item identifiers.

21 Claims, 4 Drawing Sheets

(56) References Cited

U.S. PATENT DOCUMENTS

| | | | |
|---|---|---|---|
| 7,772,478 B2 | 8/2010 | Whitman et al. | |
| 8,214,390 B2* | 7/2012 | Watfa | G06F 17/30702 707/756 |
| 9,158,794 B2* | 10/2015 | Higgins | H04W 4/02 |
| 2005/0097121 A1* | 5/2005 | Sally et al. | 707/102 |
| 2005/0187962 A1* | 8/2005 | Grondin | G06F 16/1744 |
| 2006/0143171 A1 | 6/2006 | Doerre et al. | |
| 2007/0276733 A1* | 11/2007 | Geshwind | G06Q 30/02 705/14.49 |
| 2008/0059461 A1 | 3/2008 | Brock et al. | 707/6 |
| 2008/0071519 A1 | 3/2008 | Brun et al. | 704/9 |
| 2008/0133565 A1* | 6/2008 | Yasuda | G06F 16/319 |
| 2008/0147711 A1 | 6/2008 | Spiegelman et al. | 707/102 |
| 2009/0319500 A1 | 12/2009 | Agrawal et al. | 707/4 |
| 2009/0319518 A1* | 12/2009 | Koudas | G06F 16/951 |
| 2010/0030713 A1* | 2/2010 | Simpson | G06F 17/30702 706/11 |
| 2010/0313258 A1 | 12/2010 | Chaudhuri et al. | 726/9 |
| 2011/0022600 A1* | 1/2011 | Sathe | G06F 16/319 707/742 |
| 2012/0041969 A1 | 2/2012 | Priyadarshan et al. | 707/769 |
| 2012/0222050 A1* | 8/2012 | Kidron | G06F 17/30867 719/318 |
| 2012/0222133 A1* | 8/2012 | Kidron | G06F 15/167 726/28 |
| 2013/0262089 A1 | 10/2013 | Whitman et al. | |
| 2013/0262469 A1 | 10/2013 | Whitman | |

OTHER PUBLICATIONS

Int'l Search Report and Written Opinion of the Int'l Searching Authority for Int'l Pat. Appl'n. No. PCT/US2013/034130, dated Jun. 26, 2013, (10 pages).

Int'l Search Report and Written Opinion of the Int'l Searching Authority for Int'l Pat. Appl'n. No. PCT/US2013/034132, dated Jun. 6, 2013, (13 pages).

Summons to Attend Oral Proceedings Pursuant to Rule 115(1) EPC from European Appl'n. No. 13715110.6, dated Sep. 25, 2018.

Berry et al. "Matricies, Vector Spaces, and Information Retrieval", SIAM Review, vol. 41, No. 2, Jan. 1, 1999, pp. 335-362 (1999).

* cited by examiner

301

| Music Taste Record | | | |
|---|---|---|---|
| TPID | Artist ID | Play# | ... |
| CA1234 | AR1234 | 7 | |
| . | . | . | |

Inverted Indices

AR1234 → [f3x89, f4x96,...]
Sexy → [f2x01, f3x89,...]
Beyonce → [f3x89]
.
.
.

REAL TIME MAPPING OF USER MODELS TO AN INVERTED DATA INDEX FOR RETRIEVAL, FILTERING AND RECOMMENDATION

CROSS REFERENCE TO RELATED APPLICATION

This application claims priority to U.S. Provisional Application No. 61/617,558 filed Mar. 29, 2012, the contents of which are incorporated herein by reference.

BACKGROUND OF THE INVENTION

Field of the Invention

The present invention relates generally to information processing, and more particularly to mapping user models to an inverted data index for retrieval, filtering and recommendation.

Related Art

An inverted index is an index data structure that stores a mapping from contents in a document to the positions of the contents in that document. The term "document" refers to whatever units a retrieval system is built over and is to be broadly interpreted to include any machine-readable and machine-storable work product. For example, a document may be a file containing words, numbers or symbols, a text document such as a memo or chapter of a book, and the like. The files may be of any type, such as text, audio, image, video, etc. A set of documents over which a retrieval is performed is referred to as a "collection", "document collection", "corpus" or "body" of documents. The set of distinct terms (also referred to as "tokens") occurring in the collection is its "dictionary" (also referred to as "vocabulary" or "lexicon").

For each term in the dictionary a so-called "postings list" records which document the term occurs in as well as the positions of that term in the document. Each postings list in a typical implementation contains the number and positions of term occurrences in the document, for each document in which the term occurs. A query term, typically a word, can be mapped to a postings list to identify the documents that contain that term.

It is generally known that inverted indices can be used to provide fast full text searches, but they are slow to update, for example, when a document is added to the database, deleted from it, or otherwise updated.

A relational database is a collection of data items organized as a set of formally-described tables from which data can be accessed or reassembled in many different ways without having to reorganize the tables. A typical relational database employs a set of tables containing data fitted into predefined categories. Each table (which is sometimes called a relation) contains one or more data categories in columns. The standard user and application program interface to a relational database is the Structured Query Language (SQL).

A relational database management system (RDBMS) is a database management system that manages relational databases and is capable of storing and retrieving large volumes of data. Further, large scale relational database management systems can be implemented to support thousands of users accessing databases via a wide assortment of applications. An RDBMS can be structured to support a variety of different types of operations for a requesting entity (e.g., an application, the operating system or an end user). Such operations can be configured to retrieve, add, modify and delete data being stored and managed by the RDBMS.

Standard database access methods support these operations using high-level query languages, such as SQL. One of the primary operations performed with SQL is querying (also referred to herein as retrieving or selecting) data from data structures within a database.

One technical challenge involves merging data in a relational database with the data in an inverted index. Another technical challenge involves bridging a catalog record stored in a relational database to at least one inverted index for the purpose of retrieval, filtering and recommendation.

BRIEF DESCRIPTION

The example embodiments described herein provide methods, systems and computer program products for bridging a catalog record to information stored in at least one inverted index. In one embodiment, an application user interface (API) call is received from a network, where the API call is associated with a predetermined filter request including a record identifier identifying a record in a relational database. A bitset is generated based on one or more item identifiers in the record. The bitset is applied to at least one inverted index to obtain metadata associated with the one or more item identifiers.

A map of the record identifier and the one or more item identifiers in an index can also be stored. Using the index, the one or more item identifiers associated with the record can be enumerated.

In one embodiment, the one or more item identifiers in the relational database correspond to one or more representations of media content and the metadata corresponds to data about the one or more item identifiers.

The one or more item identifiers can be values representing media content and the predetermined filter request is a request that causes generation of a bitset that identifies at least one document corresponding to the one or more item identifiers. The one or more item identifiers can be values representing media content and the predetermined filter is a request that causes generation of a bitset that identifies at least one document containing metadata associated with the one or more item identifiers.

Another record from the relational database can be obtained using another identifier. Another bitset based on another set of items in the relational database can then be generated. In this embodiment, the other set of items are associated with the other identifier. One or more Boolean, logical or set operations, or a combination thereof can be performed on the bitsets. For example, these operations can be used to combine or XOR one or more bitsets, create a union of bitsets, intersection of bitsets, difference of bitsets, complement of a bitset, invert a bitset, and the like.

A value corresponding to a rule associated with the record can be received via a connection to the inverted index. In this embodiment, a second bitset is generated based on the rule and the metadata.

BRIEF DESCRIPTION OF THE DRAWINGS

The features and advantages of the example embodiments of the invention presented herein will become more apparent from the detailed description set forth below when taken in conjunction with the following drawings.

FIG. 3 illustrates a representative view of a taste profile according to an example embodiment.

FIG. 4 depicts a representative view of inverted indices for terms associated with musical data according to an example embodiment.

DETAILED DESCRIPTION

The example embodiments of the invention presented herein are directed to methods, systems and computer program products for real time mapping of user models to an inverted data index for retrieval, filtering and recommendation, which are now described herein in terms of an exemplary user taste profile in the domain of music. This description is not intended to limit the application of the example embodiments presented herein. In fact, after reading the following description, it will be apparent to one skilled in the relevant art(s) how to implement the following example embodiments in alternative embodiments (e.g., in other domains, such as video, games, books, and the like).

A taste profile (also referred to as a "catalog") is a named collection of media content items that can be used as input to application programming interface (API) calls. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to mine music preferences.

In order to associate the taste profiles with the metadata, a record corresponding to a taste profile is bridged to the information stored in at least one inverted index. Efficient retrieval, filtering and recommendation can be achieved by bridging the relational database to the inverted index according to the example embodiments described herein.

Figure 1:
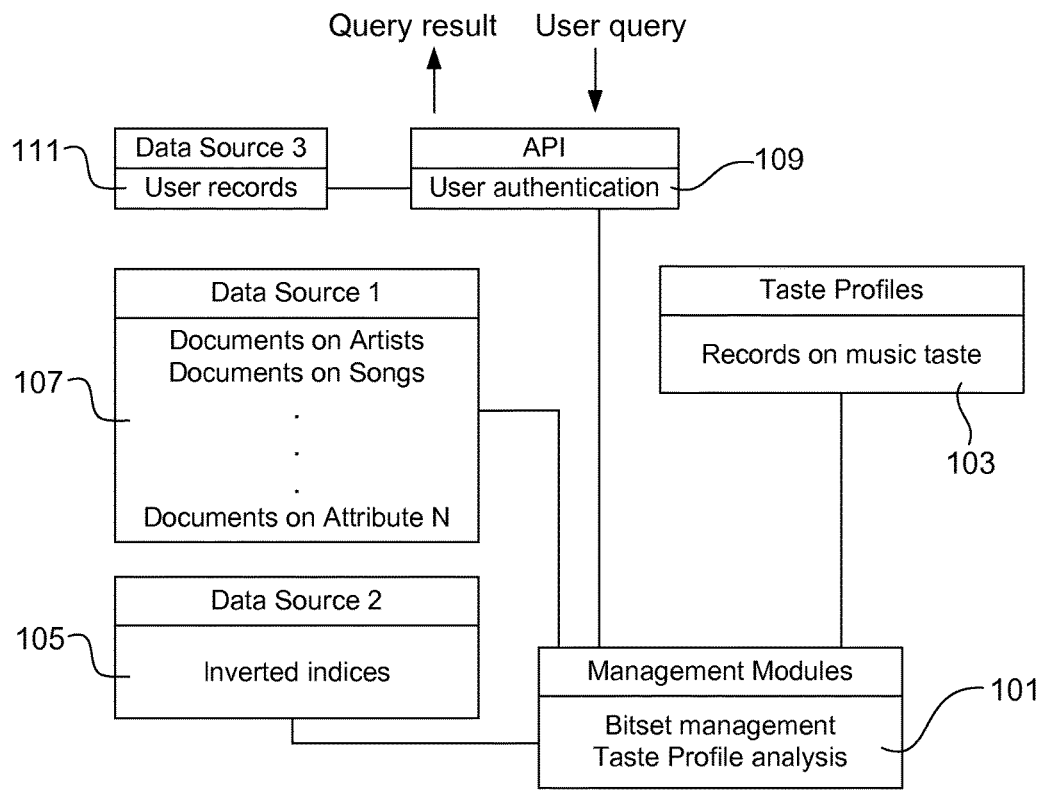
FIG. 1 is a representative view of a system in which some embodiments of the invention may be implemented.

FIG. 1 illustrates a representative view of a system in which some embodiments of the invention may be implemented. The environment comprises several modules, which may be embodied as, for example, computer hardware elements executing software, as described below with respect to FIG. 6.

As shown in FIG. 1, the system includes management modules 101, which control processing including taste profile analysis.

Taste profiles 103 contains records indicating the music taste (or other tastes) of users. In one example embodiment, each taste profile is a representation of musical activity, and may include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy", "sexy", etc. An exemplary taste profiles 103 data store is the open source relational database management system (RDBMS) that runs as a server providing multi-user access to a number of databases named MySQL. Further details of the taste profile are described below with respect to FIG. 3.

Data source 105 contains records as inverted indices in which terms are indexes to documents for artist names or song titles. For example, the terms "Sexy", "R&B", and "Dance" might index to a document for artist "Beyonce", as described more fully below with respect to FIG. 4. An exemplary platform for storing such inverted indices is the open source enterprise search platform from the Apache project named Solr.

Data source 107 is a data set which contains (1) documents over various domains, such as artists and titles, and (2) terms and weights associated with each artist and/or each title. Such data is also referred to as metadata (i.e., data about data).

Figure 2:
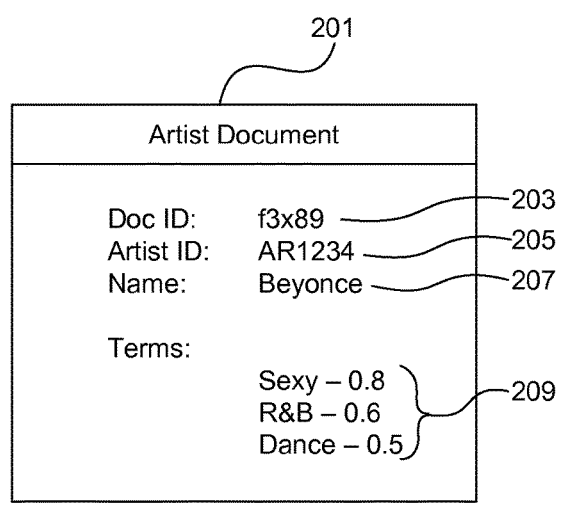
FIG. 2 illustrates a representative view of a set of musical data for an artist according to an example embodiment.

FIG. 2 illustrates an example document 201 according to such a data set. Document 201 contains a document ID 203 which uniquely identifies the document. In one embodiment, the domain concerns musical artists. In accordance with such a domain, document 201 contains an artist ID 205, an artist name 207, and a list of descriptions 209 related to a subject of the domain under consideration, in this case the artist. Each description is a term-weight pair, where the term describes the subject and the weight indicates how closely the term describes the subject. Data source 107 may store a wide range of terms associated with each artist name or song title, and may be updated at regular intervals, e.g., once per week or month.

For example, one example embodiment might include a data set including over 10,000 terms for each artist from various sources of data about music (or other media such as books, movies or games), along with associated weights. The terms may be weighted based on how important, how often mentioned or how closely related the term is to the artist. The terms may contain information about location, genre, style, marketing classifications, sales predictions, reviews, chat room dialogue transcriptions, biographies, recent news articles, time-dependent popularity and familiarity data, cultural analysis data, and the like. For example, the artist "Beyonce" might be associated with a vector of terms including "sexy", "R&B", "dance", etc., with corresponding weights of 0.8, 0.6 and 0.5. In another example, "Aphex Twin" might be represented not by a single entity, but rather by a vector of terms with probabilities, e.g., ["idm":0.9, "glitch":0.5, "hardcore":0.2], etc. Additional information regarding generation of terms and weights can be found in U.S. Pat. No. 7,772,478, entitled "Understanding Music", the contents of which are incorporated by reference herein.

API 109 is an application programming interface (API) used to communicate with a client device to receive or transmit information. In addition, API 109 may present a user interface to a client device or interact with a client device to receive input and display output.

User database 111 contains records having identification information of users. In this example, "user" may correspond to a customer such as a digital music, video or book service who submits a query on behalf of one or more of its customers. The particular request may come via a client device or a remote server of the content provider. "User" may correspond to a person or group whose musical tastes are being examined, as described more fully below. In either case, a user may or may not be required to register and/or input other data to the database. API keys may also be used to authenticate users. For example when an API call is made, an API key is passed to API 109 to authenticate the client device. Only the API key that calls the taste profile API can be used to receive the taste profile identifiers or information associated with the API key. For example, the API call may include an API key parameter that is used to identify the requestor (e.g., a developer or service provider). Only results associated with TPIDs associated with that requestor will be communicated (e.g., customers of the developer or service provider).

The embodiments described herein allow taste profiles to be used for a number of purposes. One use of taste profiles is for personal playlisting. An API call associated with personal playlisting, can be used to return a playlist. For example, the songs listed in the playlist are constrained to the songs in a taste profile associated with a user.

Another exemplary use case is for event recommendation. A taste profile can be created, for example, for a festival that contains all the artists in the festival. Music recommendations can be constrained to artists in the taste profile.

Another use case is for personalized recommendation, where the contents of a taste profile are used to represent an individual's taste. This API call uses a taste profile as a seed for obtaining recommendations or playlists of similar artists.

Another exemplary taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items).

Yet another exemplary use case for taste profiles is referred to as user-to-user recommendation. This API call is used to discover users with similar tastes by comparing the similarity of taste profile item(s) associated with users.

FIG. 3 illustrates an entry in taste profiles 103, which contains records indicating user musical (or other) tastes. In one example embodiment, a taste profile is a representation of musical activity, and includes a wide range of information such as artist plays, song plays, skips, ratings by the user, date of listen by the user, songs per day, playlists, play counts, start/stop/skip data for portions of a song or album, contents of collections, user rankings, preferences, or mentions, etc. Thus, the taste profile data includes, in addition to an artist name or a song title, one or more of the following: length of listening activity for a song, length of listening activity for an album, and user actions during song or album play, such as fast forwarding, track skipping, stopping or pausing the song, or other media plays, such as websites visited, book titles, movies watched, playing activity during a movie or other presentations, ratings, or terms corresponding to the media, such as "comedy", "sexy", etc.

A taste profile can represent a single user or multiple users. Conversely, a single user or entity can have multiple taste profiles. For example, one taste profile could be generated in connection with a user's song play activity, whereas another separate taste profile could be generated for the same user based the user's selection of songs/artists for a playlist.

In addition, taste profile data can also contain third party data about users (anonymous or otherwise) via the use of key-value information. For example, social media sites can be examined to create anonymous users and anonymous taste profiles based on mentions of a song title or an artist. In another example, a third-party audio streaming service can update taste profiles based on song "events", such as streaming of a new song.

Accordingly, it should be understood that taste profiles need not be associated with particular end users and can instead be used for more general queries. Services may also generate their own taste profiles and filter those taste profiles. A radio station recommender, for example, can use one or more taste profiles to obtain similarity results. In this example, the radio station recommender generates a taste profile associated with a radio station in general that is not necessarily associated with any particular listener(s) (referred to as a "radio station profile"). This can be accomplished for example, by using generating a taste profile with a key/value store, and using this information to filter results. A 'type' key can be added to one or more taste profiles, to indicate whether the taste profile represents a listener, playlist, or the radio station.

To build a radio station recommender, the results of a taste profile are, for example, restricted. An API call to return, for example, similar artists, can be made using taste profiles restricted to a "type" of "radio station". Likewise, a musical dating service can be implemented by restricting the results to listener taste profiles with the desired gender and a relationship-status of a user.

An artist name or song title in a taste profile may be resolved from multiple different textual representations in a taste profile. For example, an artist or song might be commonly represented by multiple nicknames, abbreviations, formats, misspellings, aliases, and the like. Accordingly, the system may take raw text which might include these abnormalities and resolve them to a formal artist or song title. Such resolution could be performed in a server performing other aspects of the invention, or could be performed off-site in another device.

In addition, priority or preference values for a particular song or artist can be stored in the taste profile and can be weighted more heavily if, for example, an artists or song is listened to more frequently, or if a user has identified favorite artists or songs.

While the disclosure refers mainly to using musical data such as artist name or song title for purposes of clarity, it should be understood that the disclosure is not limited thereto. In particular, another media preference (e.g., book, movie or game preference) can be used instead of, or in combination with, musical data. For example, number of views or reads, mentions from social media networks, user settings, playlists or favorites lists can be obtained by crawling or mining this information from the web or other user data to determine preferences related to types of content other than music, for example, book, movie or game titles. Thus, according to the invention, the data set and corresponding terms and weights can be one of a musical data set, a book data set, a movie data set, a game data set, or some combination thereof.

In one example, the taste profile database 103 is updated continuously. For example, a record is added when a user listens to a new song, and the record is updated when an update of the user preference for the song is received via a client device. In one embodiment, the information received from the client device is stored in the database, the correct "matched" metadata is added, and a play count is initialized. For example, a taste profile update with "Britney Spears—Oops" gets resolved to the actual song ID and metadata for "Britney Spears" and "Oops, I Did It Again", with a play count of 1. If a fingerprint code (e.g., an audio fingerprint code) is sent to initialize a taste profile item, the system can resolve the fingerprint code to metadata and discard the fingerprint code. Taste profiles can also be generated by collecting text from any website which is publicly accessible including Facebook pages, Twitter feeds, Google+ pages, YouTube postings and the like, such as described in U.S. patent application Ser. No. 13/850,044, filed Mar. 25, 2013, entitled "NAMED ENTITY EXTRACTION FROM A BLOCK OF TEXT", which is hereby incorporated by reference in its entirety.

Referring back to FIG. 1, taste profiles 103 contains records indicating the music taste (or other tastes) of users. Each taste profile is a representation of musical activity, and may include a wide range of information. Taste profiles 103 can be implemented as one or more relational databases or in any other way that allows fast query processing and scaling.

Returning to FIG. 3, a record 301 in taste profiles 103 contains a taste profile ID 303 corresponding to a user. The record 301 may further contain various fields identifying a song, such as an artist ID 305 identifying the performer of the song, a play count 307, and an album number or track number identifying the medium of the song (not shown). In addition, the record 301 may contain various fields indicating a user's affinity for the song, such as a play count 307 and a review.

Each record 301 in the taste profile is used to produce, for each taste profile ID 303, a list of terms, where the length of the list generally ranges between 1 and 100,000. Each record 301 can be implemented as a covering index residing in RAM for fast random access by management modules 101.

Referring to FIGS. 1 and 4, FIG. 4 illustrates a representative view of inverted indices stored in data source 105, which is an index database containing records as inverted indices in which terms are indexes to documents. Of course, records can be implemented in any other way that allows fast retrieval of desired information. An inverted index 403 can be generated for any term that appears in the documents in the document database 107. The term is then mapped to the list of documents that contain the term. The inverted indices in data source 105 allow the artists, songs or other subjects in music domains that might be associated with terms corresponding to a user's music experience to be identified quickly.

Functionally, the API 109 takes a request from a client device, and authenticates users included in the request against the user database 111. Upon successful authentication, the request is passed to the management module 101. After the management module 101 performs processing to fulfill the request and sends the processing result back to the network, the API 109 outputs the processing result to the client device.

Other databases (not shown) may be communicatively linked to management modules 101. Such additional databases may store music requests each corresponding to one or more users, each representing a list of documents over a specific domain that is associated with specific users. Still other databases may contain records mapping a user to the list of records in the taste profile database 103.

Figure 5:
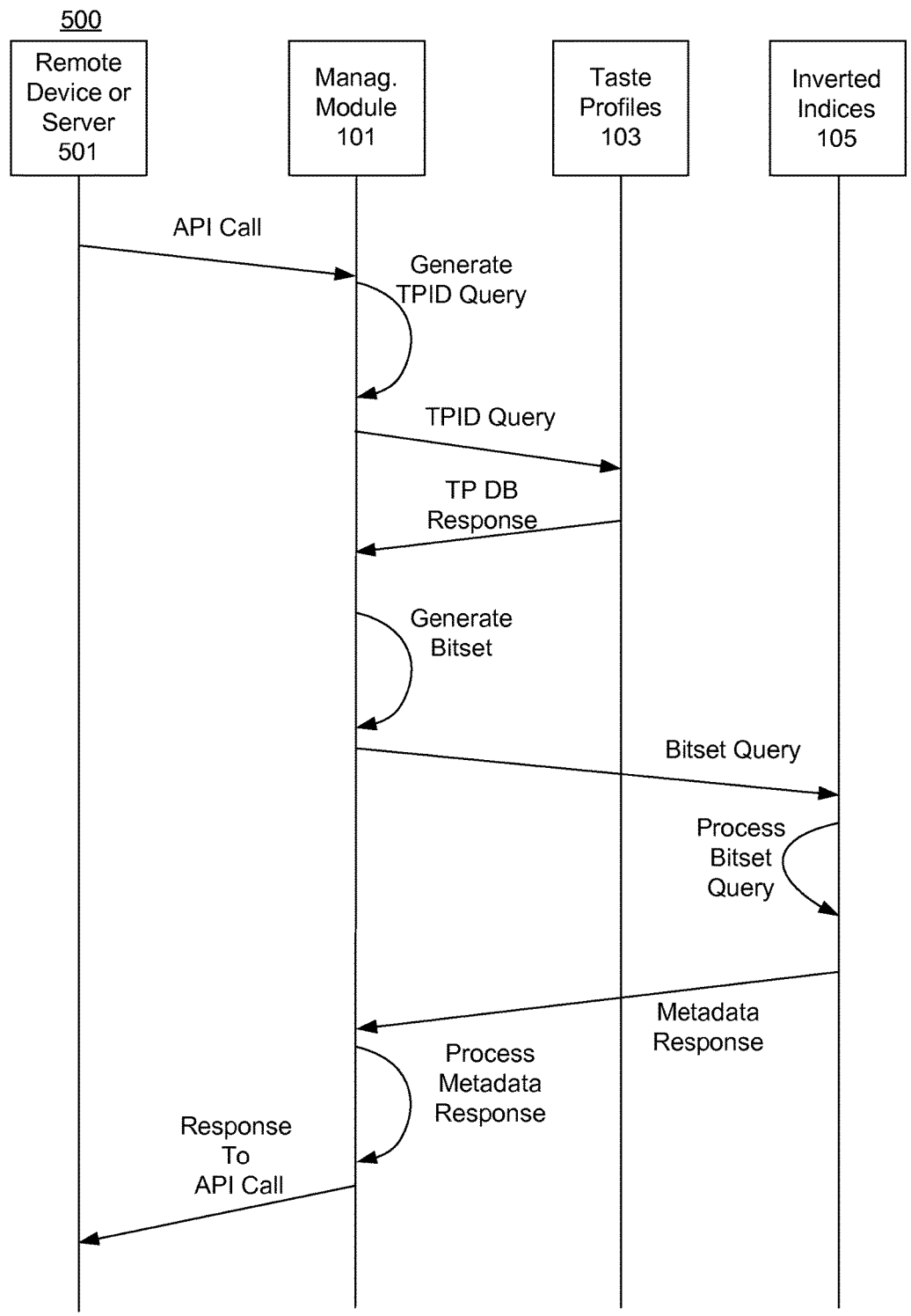
FIG. 5 is a diagram illustrating an exemplary process for generating a bitset based on an API call in accordance with an exemplary embodiment.

FIG. 5 is a diagram illustrating an exemplary process 500 for generating a bitset based on an API call in accordance with an exemplary embodiment. An API call (API Call of FIG. 5) is generated by a remote device or server 501 and received by API 109 (not shown). The API call, which includes a TPID may also be referred to as a "filter request".

The API call is associated with relational database data source 103, which is different than the inverted indices data source 105. In order to query (or filter) the inverted indices contained in data source 105, management module 101 generates a query term for data source 105 based on the particular API call request and TPID. The query term is in the form of a bitset. This allows the TPID, which is not stored in any inverted index in data source 105, to be expanded into a bitset that can be stored in memory (e.g., RAM) and applied to data source 105 at query time. The bitset corresponds to one or more documents stored in data source 107 that are associated with an item in the taste profile associated with the TPID.

Particularly, management module 101 generates a TPID query term (TPID Query) for the taste profiles database 103 based on the TPID communicated by the API call. In one embodiment, a table corresponding to data source 103 is stored in cache or other memory. In response to the TPID query, data source 103 returns a value corresponding to at least one other item in the taste profile record (TP DB Response). Which taste profile item(s) corresponding to the TPID query are returned depends on the type of API call. An exemplary taste profile record item is an artist identifier (Artist ID).

The taste profile database response is, in turn, used by management module 101 to generate a bitset in memory identifying all documents in data source 107 (not shown) containing that taste profile term value(s), particularly those documents corresponding to the particular API call. The resulting bitset is a long vector of bits where each bit represents at least one document in data source 107 (not shown) associated with the particular API call and the taste profile item obtained from the taste profile database 103.

The generated bitset is then communicated to the inverted indices database 105 (Bitset Query), which in turn process the bitset. The results are returned to the management module 101 which in turn uses the results to generate a response to the original API call.

The above technique allows inverted indices contained in data source 105 to be quickly (e.g., at query time) segmented by a record from data source 105 and used to filter and seed documents based on ownership data (e.g., the taste profile records) provided in another atomic data store (e.g., data store 103). The results from the query on data source 105 can then be processed in order to provide several taste profile use cases. The particular use case will determine how the results of the filtering technique described herein are processed.

One use case is a request for similar artists associated with one or more artists in the taste profile record associated with a particular TPID. The API call has a value corresponding to this request (e.g., API call value: ARTIST_SIMILAR). A query is performed on the taste profile data source 103 to return values associated with artist(s) in the record associated with the TPID (e.g., FIG. 3, Artist ID: AR1234). A bitset that contains all documents in data source 107 associated with the artist is in turn generated and sorted based on the API call (similar artist query).

The bitset can be generated based on any taste profile record item capable of being indexed by the inverted indices. In addition, more than one value may be associated with a particular taste profile record item. For example, more than one value may be associated with an artist identifier (Artist ID) for a given TPID.

To avoid having to regenerate a bitset for a particular TPID, a bitset can be stored in memory and reused.

In an exemplary use case, a bitset generated based on a taste profile is inverted so that the matches (i.e., the documents and/or metadata associated with those documents that the inverted bitset points to) are only those that are not in response to a query. As a result, a recommendation request can be made that returns results that are, for example, not in the taste profile. For example, a user who has indicated they have listened to musical artist A, song B, movie F, the bitset might be:

b_0=A:1 B:1 C:0 D:0 E:0 F:1 G:0 H:0

The bitset can, in turn, be inverted to instead be b_1=A:0 B:0 C:1 D:1 E:1 F:0 G:1 H:1

Thus, bitset b_0 can be used to obtain metadata about affiliated artists and media, for example in response to a recommendation query API call, and bitset b_1 can be used to gather metadata about artists and media that are not affiliated with the taste profile. In other words, bitset b_1 can be applied to obtain results related to media not in a taste profile associated with the API call.

Figure 6:
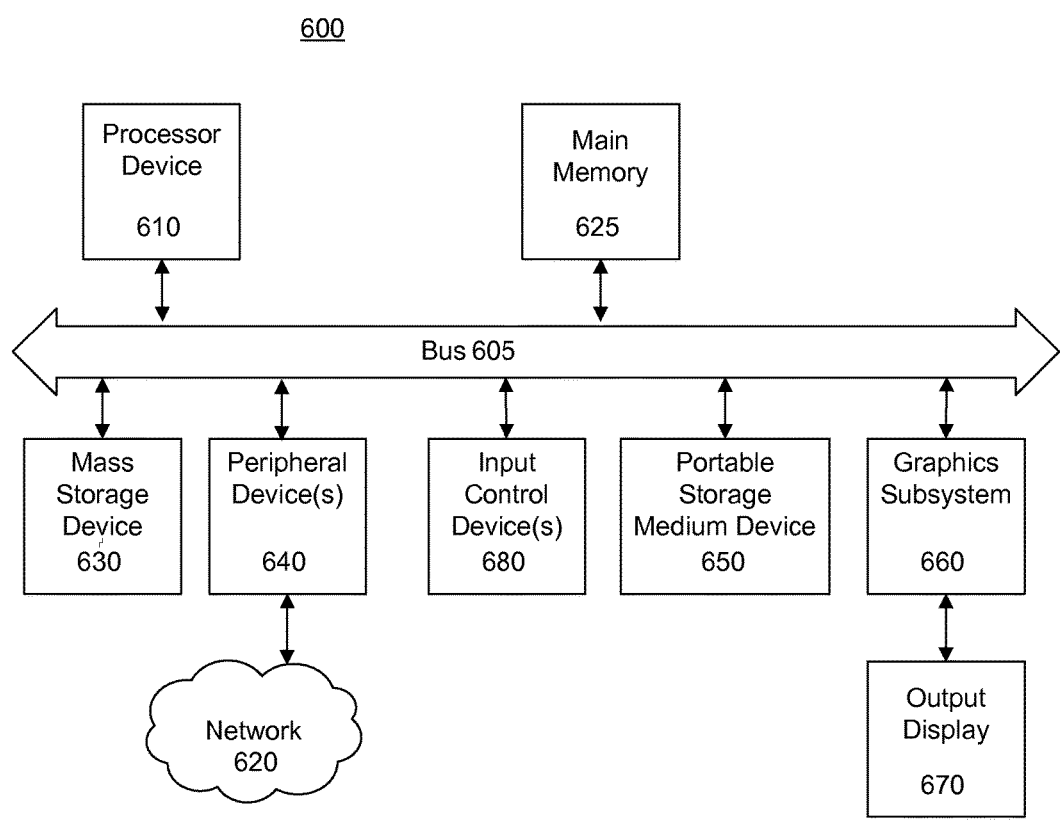
FIG. 6 is a block diagram of a device for use with various example embodiments of the invention.

FIG. 6 is a block diagram of a general and/or special purpose computer 600, which may be a general and/or special purpose computing device, in accordance with some of the example embodiments of the invention. The computer 600 may be, for example, a user device, a user computer, a client computer and/or a server computer, among other things.

The computer 600 may include without limitation a processor device 610, a main memory 625, and an interconnect bus 605. The processor device 610 may include without limitation a single microprocessor, or may include a plurality of microprocessors for configuring the computer 600 as a multi-processor system. The main memory 625 stores, among other things, instructions and/or data for execution by the processor device 610. The main memory 625 may include banks of dynamic random access memory (DRAM), as well as cache memory.

The computer 600 may further include a mass storage device 630, peripheral device(s) 640, portable non-transitory storage medium device(s) 650, input control device(s) 680, a graphics subsystem 660, and/or an output display interface 670. For explanatory purposes, all components in the computer 600 are shown in FIG. 6 as being coupled via the bus 605. However, the computer 600 is not so limited. Devices of the computer 600 may be coupled via one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 630 may be a nonvolatile storage device for storing data and/or instructions for use by the processor device 610. The mass storage device 630 may be implemented, for example, with a magnetic disk drive or an optical disk drive. In a software embodiment, the mass storage device 630 is configured for loading contents of the mass storage device 630 into the main memory 625.

The portable storage medium device 650 operates in conjunction with a nonvolatile portable storage medium, such as, for example, a compact disc read only memory (CD-ROM), to input and output data and code to and from the computer 600. In some embodiments, the software for storing information may be stored on a portable storage medium, and may be inputted into the computer 600 via the portable storage medium device 650. The peripheral device(s) 640 may include any type of computer support device, such as, for example, an input/output (I/O) interface configured to add additional functionality to the computer 600. For example, the peripheral device(s) 640 may include a network interface card for interfacing the computer 600 with a network 620.

The input control device(s) 680 provide a portion of the user interface for a user of the computer 600. The input control device(s) 680 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 600 may include the graphics subsystem 660 and the output display 670. The output display 670 may include a cathode ray tube (CRT) display and/or a liquid crystal display (LCD). The graphics subsystem 660 receives textual and graphical information, and processes the information for output to the output display 670.

Each component of the computer 600 may represent a broad category of a computer component of a general and/or special purpose computer. Components of the computer 600 are not limited to the specific implementations provided here.

Software embodiments of the example embodiments presented herein may be provided as a computer program product, or software, that may include an article of manufacture on a machine accessible or machine readable medium having instructions. The instructions on the non-transitory machine accessible machine readable or computer-readable medium may be used to program a computer system or other electronic device. The machine or computer-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "computer-readable", "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-6 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for bridging a record in a relational database to documents mapped by at least one inverted index, comprising the steps of:
   receiving an application user interface call including (i) a call value indicating a predetermined request and (ii) a record identifier identifying a record in the relational database, the record representing media content activity;
   retrieving from the record one or more item identifiers;
   generating a bitset based on the application user interface call, the bitset representing one or more item identifiers in the record, wherein each of the one or more item identifiers corresponds to a term of the at least one inverted index, wherein each term is mapped to one or more documents in a data source containing the term, the documents containing metadata, and each bit of the bitset represents at least one of the documents in the data source; and
   applying the bitset as a query term to the at least one inverted index to identify documents in the data source associated with the one or more item identifiers to obtain metadata associated with the one or more item identifiers from the documents.

2. The method according to claim 1, further comprising:
   storing a map of the record identifier and the one or more item identifiers in an index; and
   enumerating, using the index, the one or more item identifiers associated with the record.

3. The method according to claim 1, wherein the one or more item identifiers in the relational database correspond to a representation of media content and the metadata corresponds to data about the one or more item identifiers.

4. The method according to claim 1, wherein the one or more item identifiers are values representing media content and the predetermined request is a request that causes generation of a bitset that identifies at least one document corresponding to the one or more item identifiers.

5. The method according to claim 1, wherein the one or more item identifiers are values representing media content and the predetermined request is a request that causes generation of a bitset that identifies at least one document containing metadata associated with the one or more item identifiers.

6. The method according to claim 1, further comprising:
   obtaining another record from the relational database using another identifier; and
   generating another bitset based on another set of items in the relational database, wherein the other set of items are associated with the other identifier; and
   performing at least one of a Boolean operation, a logical operation and a set operation, or a combination thereof on the bitsets.

7. The method according to claim 1, further comprising:
   receiving, via a connection to the at least one inverted index, a value corresponding to a rule associated with the record; and
   generating a second bitset based on the rule and the metadata.

8. A non-transitory computer-readable medium having stored thereon one or more sequences of instructions for causing one or more processors to perform:
   receiving an application user interface call including (i) a call value indicating a predetermined request and (ii) a record identifier identifying a record in a relational database, the record representing media content activity;
   retrieving from the record one or more item identifiers;
   generating a bitset based on the application user interface call, the bitset representing one or more item identifiers in the record, wherein each of the one or more item identifiers corresponds to a term of the at least one inverted index, wherein each term is mapped to one or more documents in a data source containing the term, the documents containing metadata, and each bit of the bitset represents at least one of the documents in the data source; and
   applying the bitset as a query term to the at least one inverted index to identify documents in the data source associated with the one or more item identifiers to obtain metadata associated with the one or more item identifiers from the documents.

9. The computer-readable medium of claim 8, further having stored thereon a sequence of instructions for causing the one or more processors to perform:
   storing a map of the record identifier and the one or more item identifiers in an index; and
   enumerating, using the index, the one or more item identifiers associated with the record.

10. The non-transitory computer readable medium according to claim 8, wherein the one or more item identifiers in the relational database correspond to a representation of media content and the metadata corresponds to data about the one or more item identifiers.

11. The non-transitory computer readable medium according to claim 8, wherein the one or more item identifiers are values representing media content and the predetermined request is a request that causes generation of a bitset that points to at least one document corresponding to the one or more item identifiers.

12. The non-transitory computer-readable medium according to claim 8, wherein the one or more item identifiers are values representing media content and the predetermined request causes generation of a bitset that identifies at least one document containing metadata associated with the one or more item identifiers.

13. The computer-readable medium of claim 8, further having stored thereon a sequence of instructions for causing the one or more processors to perform:
 obtaining another record from the relational database using another identifier; and
 generating another bitset based on another set of items in the relational database, wherein the other set of items are associated with the other identifier; and
 performing at least one of a Boolean operation, a logical operation and a set operation, or a combination thereof on the bitsets.

14. The computer-readable medium of claim 8, further having stored thereon a sequence of instructions for causing the one or more processors to perform:
 receiving, via a connection to the at least one inverted index, a value corresponding to a rule associated with the record; and
 generating a second bitset based on the rule and the metadata.

15. A system for bridging a record in a relational database to documents mapped by at least one inverted index, comprising:
 an interface operable to receive an application user interface call including (i) a call value indicating a predetermined request and (ii) a record identifier identifying a record in the relational database, the record representing media content activity;
 a processor configured to:
  retrieve from the record one or more item identifiers,
  generate a bitset based on the application user interface call, the bitset representing one or more item identifiers in the record, wherein each of the one or more item identifiers corresponds to a term of the at least one inverted index, wherein each term is mapped to one or more documents in a data source containing the term, the documents containing metadata and each bit of the bitset represents at least one of the documents in the data source, and
  apply the bitset as a query term to at least one inverted index to identify documents in the data source associated with the one or more item identifiers to obtain metadata associated with the one or more item identifiers from the documents.

16. The system according to claim 15, further comprising:
 storing a map of the record identifier and the one or more item identifiers in an index; and
 enumerating, using the index, the one or more item identifiers associated with the record.

17. The system according to claim 15, wherein the one or more item identifiers in the relational database correspond to a representation of media content and the metadata corresponds to data about the one or more item identifiers.

18. The system according to claim 15, wherein the one or more item identifiers are values representing media content and the predetermined request that causes generation of a bitset that identifies at least one document corresponding to the one or more item identifiers.

19. The system according to claim 15, wherein the one or more item identifiers are values representing media content and the predetermined request causes generation of a bitset that identifies at least one document containing metadata associated with the one or more item identifiers.

20. The system according to claim 15, further comprising:
 obtaining another record from the relational database using another identifier; and
 generating another bitset based on another set of items in the relational database, wherein the other set of items are associated with the other identifier; and
 performing at least one of a Boolean operation, a logical operation and a set operation, or a combination thereof on the bitsets.

21. The system according to claim 15, further comprising:
 receiving, via a connection to the at least one inverted index, a value corresponding to a rule associated with the record; and
 generating a second bitset based on the rule and the metadata.

* * * * *